W. L. KING.
RECEPTACLE FOR CONDENSED MILK CANS.
APPLICATION FILED SEPT. 10, 1910.
998,533.
Patented July 18, 1911.
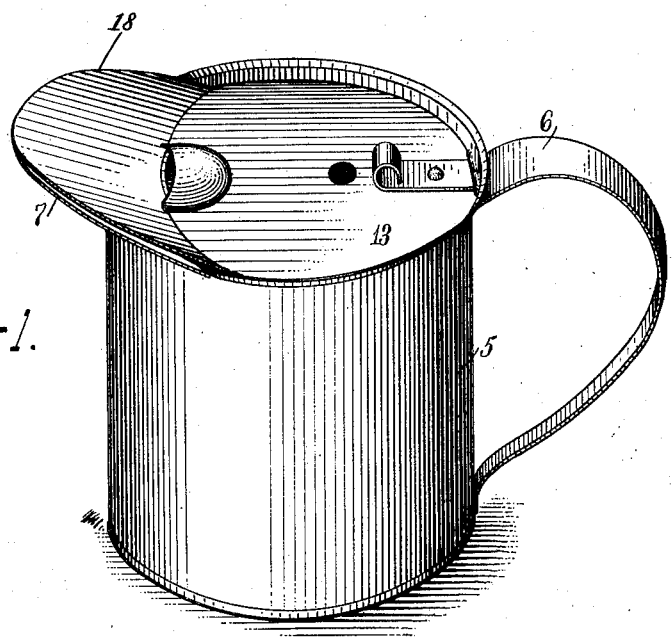
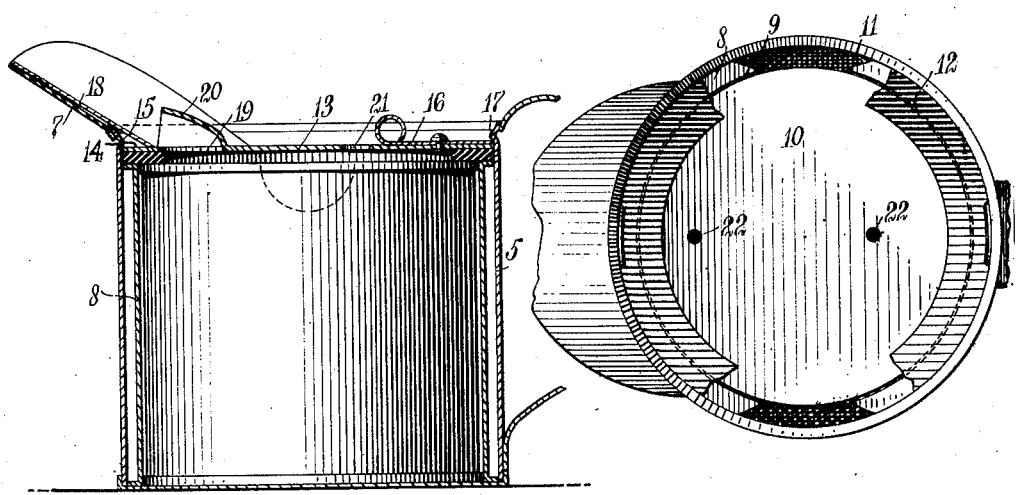
WITNESSES:
INVENTOR
Winfield L. King
BY
ATTORNEYS

UNITED STATES PATENT OFFICE.

WINFIELD LEROY KING, OF PITTSBURG, PENNSYLVANIA.

RECEPTACLE FOR CONDENSED-MILK CANS.

998,533.

Specification of Letters Patent.   Patented July 18, 1911.

Application filed September 10, 1910.   Serial No. 581,365.

*To all whom it may concern:*

Be it known that I, WINFIELD L. KING, a citizen of the United States, and a resident of Pittsburg, in the county of Allegheny and State of Pennsylvania, have invented a new and Improved Receptacle for Condensed-Milk Cans, of which the following is a full, clear, and exact description.

My invention relates to receptacles for condensed milk cans and it has for its object to provide one in which may be disposed a condensed milk can, a lid having an opening being provided for covering the receptacle, and having a spout adapted to be disposed over the spout of the receptacle.

Other objects of the invention are to provide means for covering the space between the periphery of the condensed milk can and the inner wall of the receptacle; and for holding the lid in place.

Still other objects of the invention will appear in the following complete description, in which the preferred form of my invention is disclosed.

In the drawings similar reference characters refer to similar parts in all the views, in which—

Figure 1 is a perspective view of my receptacle; Fig. 2 is a sectional elevation of the receptacle; and Fig. 3 is a plan view of the receptacle partially in section.

By referring to the drawings it will be seen that a receptacle 5 is provided having a handle 6 and a spout 7, inwardly extending members 8 being secured to the can, these inwardly extending members 8 having a circular opening 9 in which the can 10 may be disposed. There are openings 11 in the inwardly extending members 8, which are provided to enable the user to readily remove the can 10. A washer 12 is normally disposed on the inwardly extending members 8, the said washer 12 extending over the periphery of the can 10.

A lid 13 is provided for closing the receptacle, this lid 13 having a flange 14 which is normally disposed below an inwardly extending rib 15 on the receptacle 5. The lid 13 is also provided with a pivoted tongue 16, a terminal of which is normally disposed below the inwardly extending rib 17 of the receptacle 5.

Normally disposed on the spout 7 of the receptacle, there is a spout 18, which is secured to the lid 13, this spout 18 leading to an opening 19 in the lid, which is covered by a hood 20. There is also an additional opening 21 in the lid.

In using the invention two openings 22 are made in the condensed milk can 10, one of these openings 22 being positioned so that when the condensed milk can 10 is disposed in the receptacle, this opening 22 will be disposed immediately below the opening 19 in the lid 13. The condensed milk can 10 having been disposed in the receptacle 5, the washer 12 is placed on the inwardly projecting members 8 to cover the space between the inwardly projecting members 8 and the condensed milk can. This having been done, the lid 13 is placed on the washer 12 with its flange 14 disposed under the rib 15 and it is secured in place by the pivoted tongue 16 which is rotated until its terminal is disposed under the extending rib 17.

Having thus described my invention I claim as new and desire to secure by Letters Patent:

1. A receptacle having a spout, and a removable lid for the receptacle, having an opening and a spout, the spout on the lid being normally disposed over the spout on the receptacle.

2. A receptacle having a spout and adapted to receive a condensed milk can, a lid for the receptacle having an opening and a spout, the spout on the lid being normally disposed on the spout of the receptacle, and a hood secured to the lid and disposed over the opening therein.

3. A receptacle, inwardly extending members disposed in the receptacle and spaced from the top of the receptacle, a washer disposed on the inwardly-extending members and projecting inwardly therefrom, a lid having a spout and an opening disposed on the washer, and means for holding the lid in position.

4. A receptacle adapted to receive a can, an inwardly-extending member in the receptacle, a washer mounted on the member, a lid having an opening mounted on the washer, a hood projecting over the opening, and means for holding the lid in position.

5. A receptacle adapted to receive a can, an inwardly-extending member in the receptacle, a washer mounted on the member, a lid having an opening and a spout, mounted on the washer, a hood projecting over the opening in the lid, and means for holding the lid in position.

6. A receptacle having a spout and two inner ribs adapted to receive a can, a lid for the receptacle having a flange adapted to be disposed under one of the ribs, and a spout adapted to be disposed on the spout of the receptacle, and a tongue pivoted to the lid adapted to be disposed under the other rib.

7. A receptacle having a spout and two inner ribs, adapted to receive a can, a lid for the receptacle having an opening and a flange, the flange on the lid being adapted to be disposed under one of the ribs, a hood disposed over the opening in the lid, a spout secured to the lid adapted to be disposed on the spout of the receptacle, and a tongue pivoted to the lid adapted to be disposed under the other rib.

8. A receptacle having a spout and two inner ribs, adapted to receive a can, an inwardly-extending member in the receptacle, a washer disposed on the inwardly extending member, a lid for the receptacle mounted on the washer, and having a flange and an opening, the flange being normally disposed under one of the ribs, a hood projecting over the opening in the lid, a spout secured to the lid, normally disposed on the spout of the receptacle, and a tongue pivoted to the lid adapted to be disposed under the other rib.

In testimony whereof I have signed my name to this specification in the presence of two subscribing witnesses.

WINFIELD LEROY KING.

Witnesses:
GEORGE A. THOMPSON,
HERBERT GRIGGS.